(12) United States Patent
Sammak

(10) Patent No.: US 10,122,224 B2
(45) Date of Patent: Nov. 6, 2018

(54) ELECTRIC MOTOR ASSEMBLY

(71) Applicant: Filip Sammak, Fullerton, CA (US)

(72) Inventor: Filip Sammak, Fullerton, CA (US)

( * ) Notice: Subject to any disclaimer, the term of this patent is extended or adjusted under 35 U.S.C. 154(b) by 343 days.

(21) Appl. No.: 14/981,202

(22) Filed: Dec. 28, 2015

(65) Prior Publication Data

US 2017/0187251 A1 Jun. 29, 2017

(51) Int. Cl.
*H02K 7/20* (2006.01)
*H02K 17/14* (2006.01)
*H02K 1/12* (2006.01)
*H02K 1/22* (2006.01)
*H02K 16/00* (2006.01)

(52) U.S. Cl.
CPC .............. *H02K 1/12* (2013.01); *H02K 1/22* (2013.01); *H02K 16/00* (2013.01)

(58) Field of Classification Search
CPC .............................. H02K 16/00; H02K 27/18
USPC .................................. 310/112, 159, 231–247
See application file for complete search history.

(56) References Cited

U.S. PATENT DOCUMENTS

| 1,879,229 | A | * | 9/1932 | Heinrich | H02K 27/18 |
| | | | | | 310/173 |
| 2,436,936 | A | * | 3/1948 | Page | H02K 7/20 |
| | | | | | 310/112 |
| 2,469,662 | A | * | 5/1949 | Minchin | H05K 109/38 |
| | | | | | 310/112 |
| 4,358,693 | A | | 11/1982 | Palmer | |
| 4,529,902 | A | | 7/1985 | Lordo | |
| 5,274,291 | A | | 12/1993 | Clarke | |
| 5,783,893 | A | | 7/1998 | Dade et al. | |
| 5,864,198 | A | * | 1/1999 | Pinkerton | H02K 3/20 |
| | | | | | 310/112 |
| 6,147,415 | A | * | 11/2000 | Fukada | F03D 3/0427 |
| | | | | | 290/54 |
| D522,455 | S | | 6/2006 | Nishimura | |
| 9,490,678 | B2 | * | 11/2016 | Joung | H02K 21/24 |
| 2001/0006292 | A1 | * | 7/2001 | Inaba | F02N 11/04 |
| | | | | | 290/38 R |
| 2008/0252164 | A1 | * | 10/2008 | Huang | H02K 7/108 |
| | | | | | 310/112 |
| 2011/0095635 | A1 | * | 4/2011 | Li | H02K 7/116 |
| | | | | | 310/112 |

FOREIGN PATENT DOCUMENTS

JP 62272852 A * 11/1987

* cited by examiner

*Primary Examiner* — Alexander Talpalatski

(57) ABSTRACT

An electric motor assembly includes an axle having a first end and a second end. A plurality of rotor stages is attached to the axle. The rotor stages each include a set of rotor magnets. Each set has a greater potential magnetic field as the sets are located further from the first end. A plurality of stators is positioned around the rotor stages so that each of the rotor stages is adjacent to and covered by one of the stators to define a plurality of mated pairs. The stators each include a plurality of stator magnets. A stator control, for controlling individual ones of the pairs, is electrically coupled to each of the stators and magnetizes the stator magnets in a controlled fashion with respect to the rotor magnets to urge the rotor magnets in a same direction and rotate the axle.

6 Claims, 5 Drawing Sheets

ELECTRIC MOTOR ASSEMBLY

BACKGROUND OF THE DISCLOSURE

Field of the Disclosure

The disclosure relates to electric motor devices and more particularly pertains to a new electric motor device for providing adjustable power output.

SUMMARY OF THE DISCLOSURE

An embodiment of the disclosure meets the needs presented above by generally comprising an axle having a first end and a second end. A plurality of rotor stages is provided. Each of the rotor stages is attached to the axle. The rotor stages each include a set of rotor magnets or electro magnets. Each set has a greater potential magnetic field as the sets are located further from the first end and closer to the second end. A plurality of stators is provided. The stators are positioned around the rotor stages so that each of the rotor stages is adjacent to and covered by one of the stators to define a plurality of mated pairs. Each mated pair includes one of the rotor stages and one of the stators. The stators each include a plurality of stator magnets. A stator control is electrically coupled to each of the stators and energizes the stator magnets in a controlled fashion with respect to the rotor magnets to urge the rotor magnets in a same direction and rotate the axle. The stator control is configured to control one or more of the mated rotor stages to adjust power output by the axle. The axle may then be configured to be utilized as rotational force for a drive shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
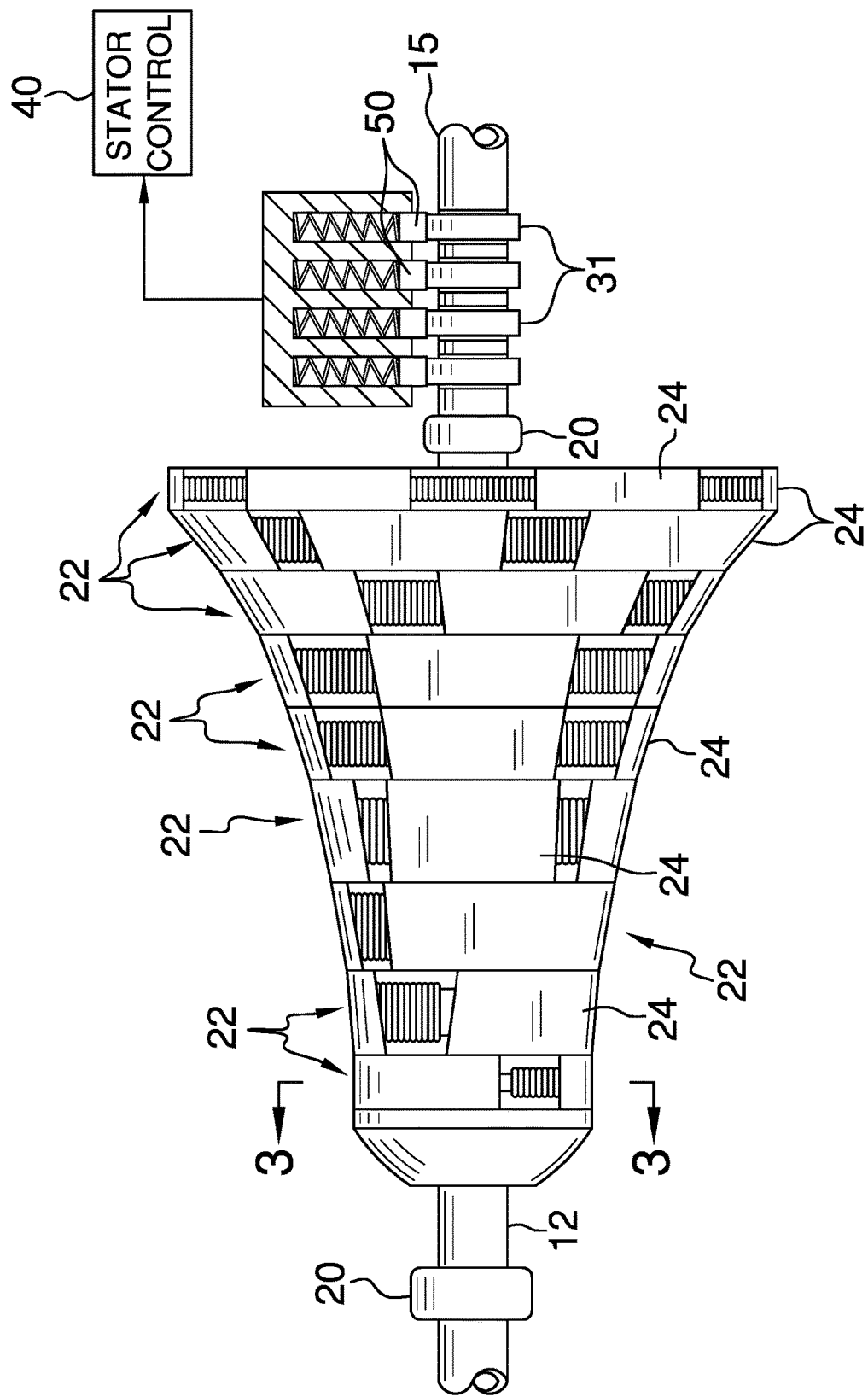
FIG. 1 is a side view of a electric motor assembly according to an embodiment of the disclosure having the stator removed.

With reference now to the drawings, and in particular to FIGS. 1 through 5 thereof, a new electric motor device embodying the principles and concepts of an embodiment of the disclosure and generally designated by the reference numeral 10 will be described.

As best illustrated in FIGS. 1 through 5, the electric motor assembly 10 generally comprises a hollow axle 12 that has a first end 14 and a second end 15. The axle 12 may be mounted, for instance, within a vehicle 16 and attached to the drive shaft 17, with or without a differential 18, to propel the vehicle 16 as indicated below. A plurality of fan blades 19 may be attached to the first end 14 to draw air across the assembly 10 for cooling purposes. Sealed self-lubricating bearings 20 may be mounted on the axle 12 to allow for easy mounting of the axle 12 and/or to attach other elements to the axle 12 which are to remain stationary with respect to the axle 12.

Figure 2:
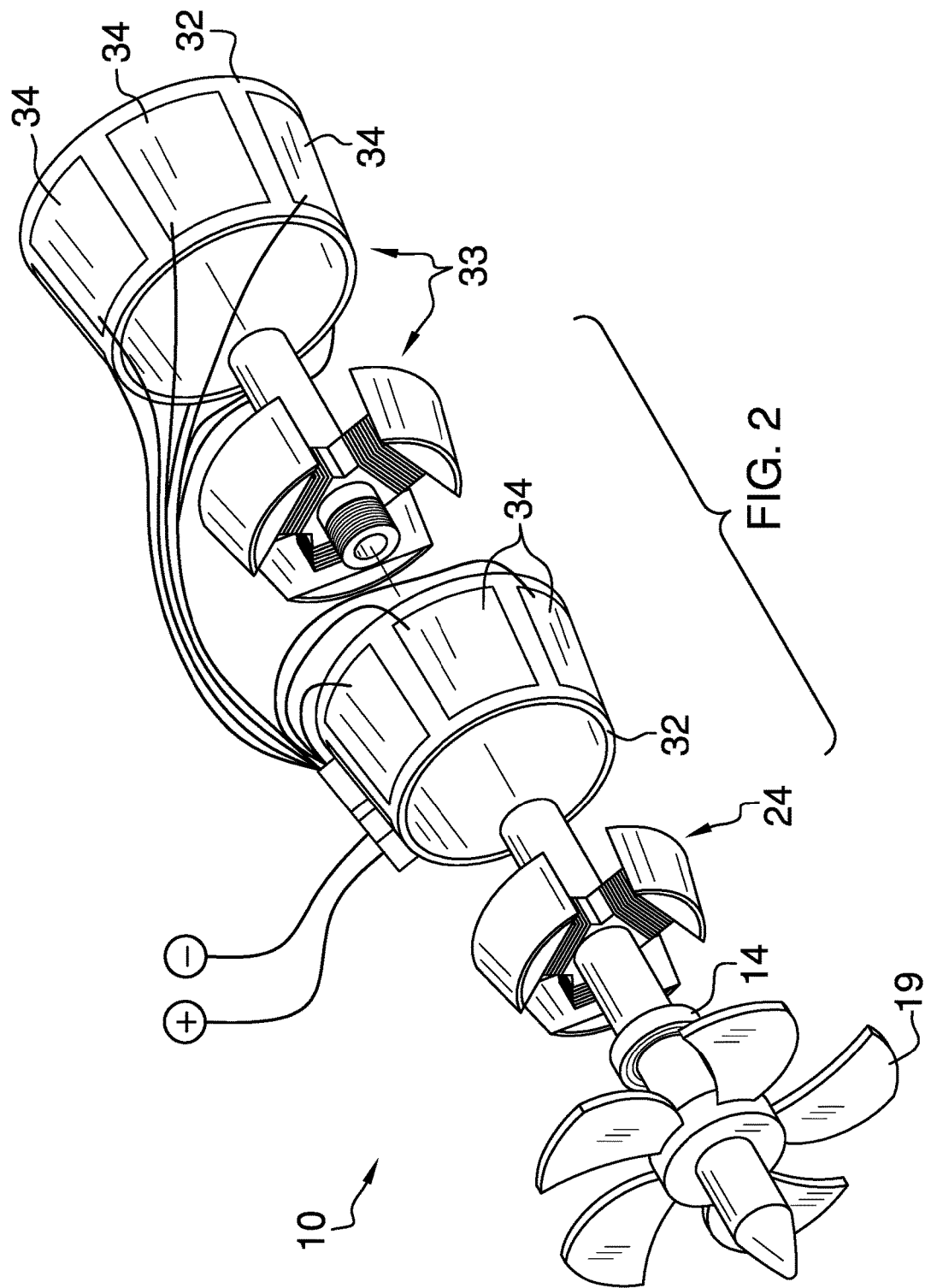
FIG. 2 is an exploded view of an embodiment of the disclosure.
Figure 3:
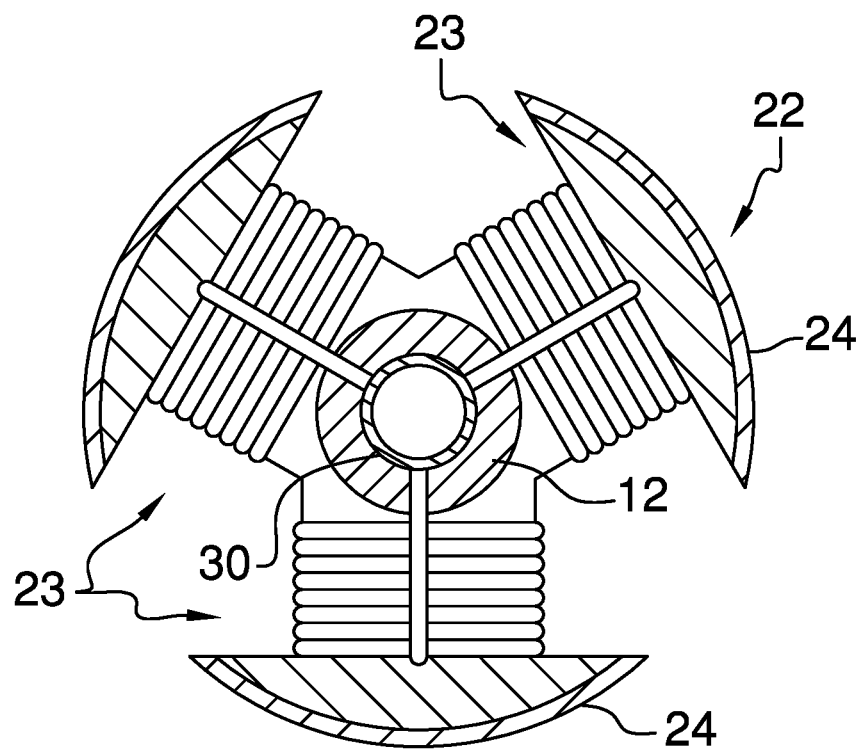
FIG. 3 is a cross-sectional view of an embodiment of the disclosure taken along line 3-3 of FIG. 1.
Figure 4:
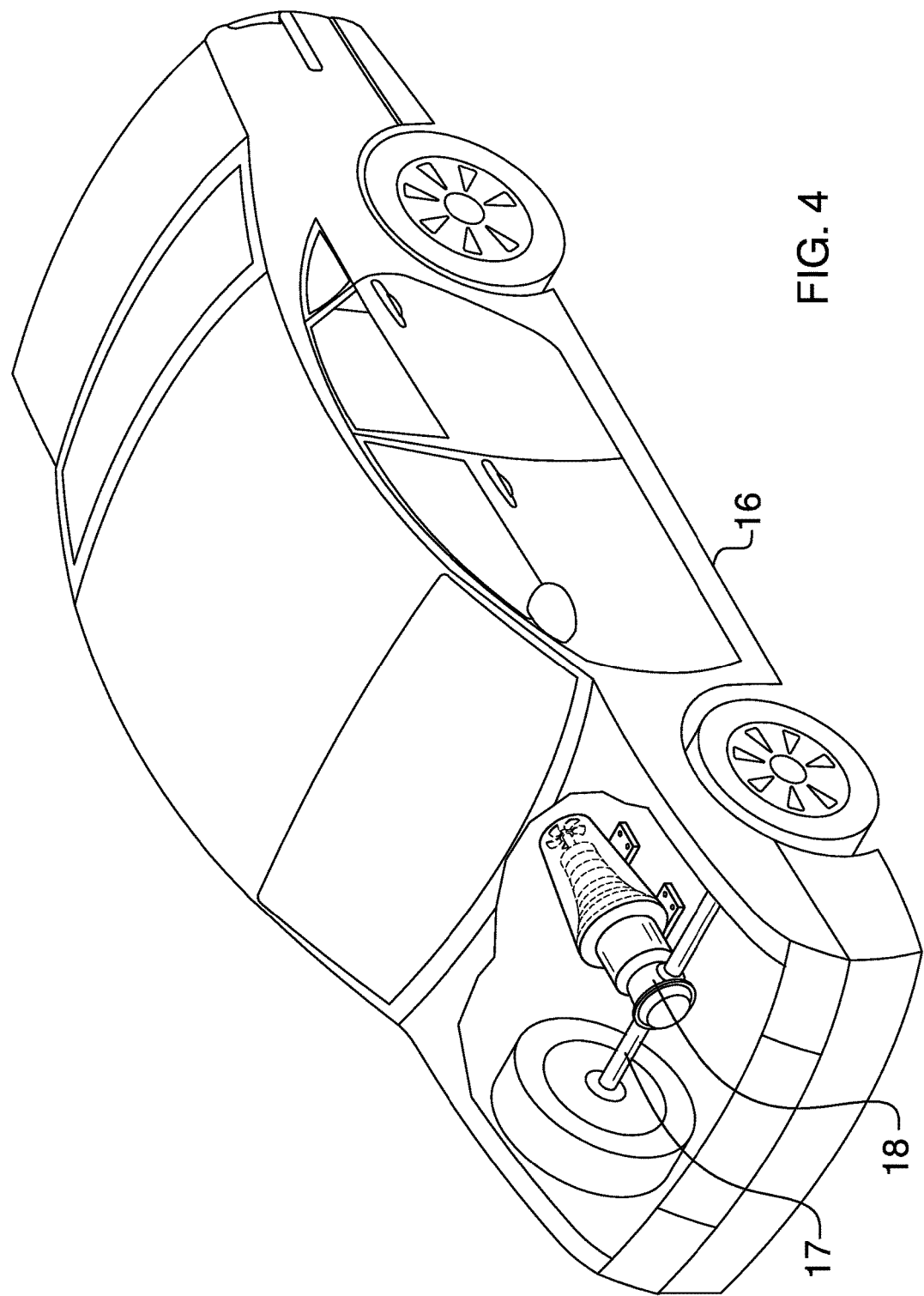
FIG. 4 is a broken perspective view of an embodiment of the disclosure.
Figure 5:
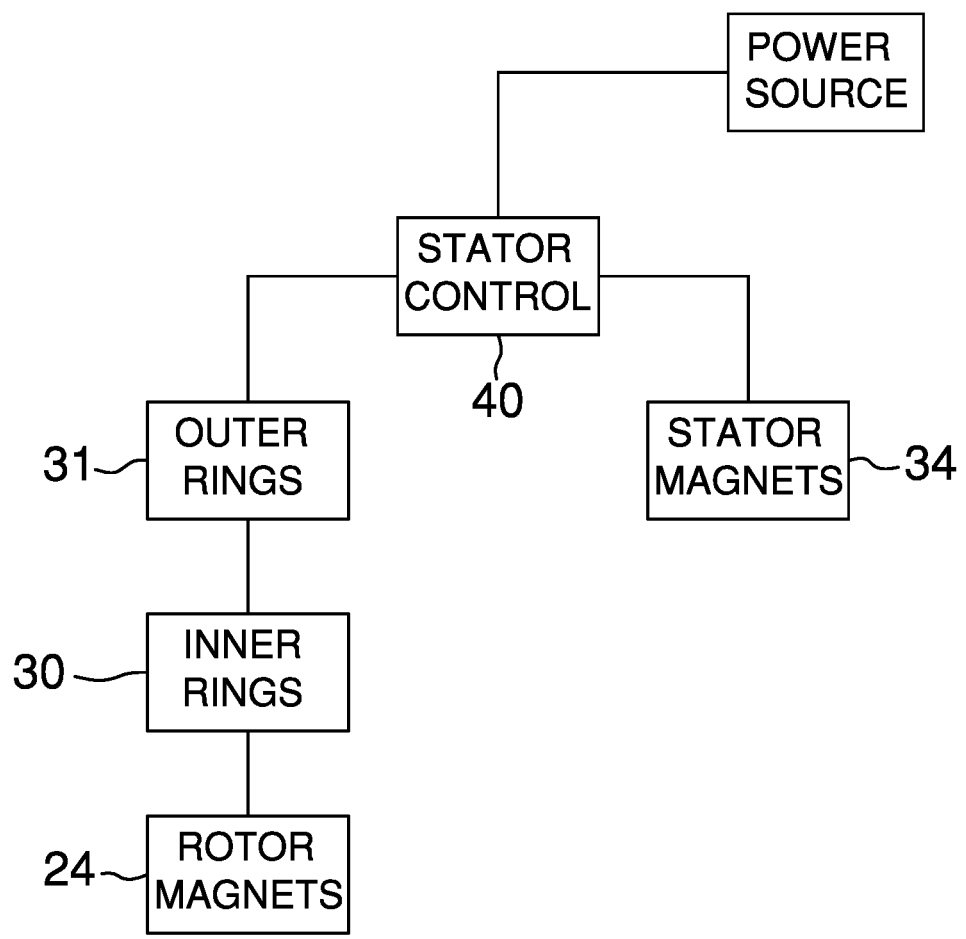
FIG. 5 is a schematic view of an embodiment of the disclosure.

A plurality of rotor stages 22 is provided. Each of the rotor stages 22 is attached to the axle 15 such that rotation of the rotor stages 22 also rotates the axle 12. Each of the rotor stages 22 includes a set 23 of rotor magnets 24 which may be electro magnets. The magnets 24, which as shown in FIG. 3, may radially extend outwardly from the axle 12. Each set 24 has a greater potential magnetic field as the sets are located further from the first end 14 and closer to the second end 15. This can be accomplished in a number of fashions. For example, each subsequent rotor stage 22 may include a set of larger rotor magnets 24 as shown in FIG. 2. Alternatively, or in addition to using larger magnets 24, each subsequent stage 22 may include a greater number of rotor magnets 24. This most apparent in FIG. 1 wherein subsequent stages 22 may include more rotor magnets 24 where simply making them larger is not feasible. Each of the rotor magnets 24 of each of the sets 23 is laterally spaced from associated ones of the rotor magnets 24 in the same set 23. In other words, each rotor magnet 24 extends out radially from the axle 12 and therefore an angle is formed between adjacent ones of the rotor magnets 24.

Each rotor magnet 24 may comprise a permanent magnet, however it may be more advantageous to for each of the rotor magnets 24 to comprise an electromagnet that is configured to be magnetized and demagnetized alternately and which may also have their field altered between positive and negative. Generally, the associated ones of the rotor magnets 24 will be simultaneously magnetized or demagnetized. The rotor magnets 24 may be powered by being in electrical communication contact with stationary inner rings 30 found within the axle 12. Corresponding outer rings 31 are mounted outside of the axle 12. Each of the outer rings 31 are electrically coupled to one of the inner rings 30. Thus, by applying electrical power to an outer ring 31, its corresponding inner ring 30 supplies electricity to the set 23 to which it engages. This will allow one set 23, or stage 22, to be magnetized independent of the other sets 23. The outer rings 31 are electrically coupled to bushings 50 that are biased against the outer rings 31 to ensure electrical contact is maintained between the outer rings 31 and a stator control 40. The outer rings 31 may be reduced in numbers by the use of a digitized controller integrated into the rotor to reduce friction.

A plurality of stators 32 is also provided. The stators 32 are positioned around the rotor stages 22 so that each of the rotor stages 22 is adjacent to and covered by one of the stators 32 to define a plurality of mated pairs 33. Figure shows an embodiment with only two pairs 33, however the assembly 10 would typically include three or more pairs 33. Each mated pair 33 includes one of the rotor stages 22 and one of the stators 32. Each of the stators 32 further includes a plurality of stator magnets 34 that are laterally spaced from each other. The mated pairs 33 may be magnetically isolated from each other using any conventional means.

A stator control 40 is electrically coupled to the rotor stages 22. Each of the stators 32 is electrically coupled to the stator control 40. The stator control 40 is configured to magnetize the stator magnets 34 in a controlled fashion with respect to the rotor magnets 24 to urge the rotor magnets 24 in a same direction and rotate the axle 12. In particular, the stator 32 will cause the stator magnets 34 to become negative or positive as magnetized ones of the rotor magnets 24 pass by to both pull the rotor magnets 24 near and then push them away as the rotor magnets 24 clear the stator magnets 34. Thus the stator control 40 could alternate the positive and negative fields in a series such that as one stator magnet 40 is made negative, the next adjacent stator magnet 40 is made positive to effective drag the rotor magnet 24 along it corresponding stator 32. Alternatively, the stator magnets 34 may be simply magnetized or demagnetized to achieve the same purpose. The stator control 40 may be particularly configured to control only a single one of the mated pairs 33 to adjust power output by the axle 12. As power is gradually transferred from sets 23 adjacent to the first end 14 to sets adjacent to the second end 15, the power output is increased. This would allow, for instance, a variable speed drive assembly without the need for a gear box.

In use, the assembly 10 may be used to power a vehicle 16 by utilizing the axle's rotational force for a drive shaft 17. However, unlike other electric motors, the assembly's 10 torque and speed can be controlled more efficiently and effectively by selecting which rotor stages 22 are activated. If more torque is needed, the larger rotor stages 22 are needed whereas high speeds would utilize the smaller rotor stages 22. The assembly 10 allows for a much larger range of torque output compared to a traditional electric engine typically controlled by an electronic torque controller.

It should also be understood that the assembly 10 may be constructed with a single stator 32 wherein the stator 32 covers all rotor stages 22. In such an embodiment, the rotor magnets 24 would be electromagnets and only the rotor stage 22 that is being utilized would be magnetized by the stator control 40. Such an embodiment may be less efficient however due to the additional number of stator magnets 34 being magnified at one time which are not being used to actually move the rotor magnets 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An electric motor assembly comprising:
   an axle having a first end and a second end;
   a plurality of rotor stages, each of said rotor stages being attached to said axle, each of said rotor stages including a set of rotor magnets, each set having a greater potential magnetic field as said sets are located further from said first end and closer to said second end, each of said rotor magnets having a an convexly arcuate outer surface facing away from said axle, said outer surfaces of each said rotor magnet of each set being increasingly spaced from said axle as said rotor sets are located on said axle from said first end of said axle towards said second end of said axle;
   a plurality of stators, said stators being positioned around said rotor stages such that each of said rotor stages is adjacent to and covered by one of said stators to define a plurality of mated pairs, wherein each mated pair includes one of said rotor stages and one of said stators, each of said stators including a plurality of stator magnets, each of said stator magnets having a concavely arcuate surface facing an associated one of said rotor stages;
   a stator control being electrically coupled to each of said stators, said stator control being configured to magnetize said stator magnets in a controlled fashion with respect to said rotor magnets to urge said rotor magnets in a same direction and rotate said axle, said stator control being configured to control only a single one of said mated pairs to adjust power output by said axle; and
   wherein said axle is configured to be utilized as rotational force for a drive shaft.

2. The assembly according to claim 1, wherein each of said rotor magnets comprises an electromagnet and being configured to be magnetized and demagnetized alternately, said stator control being electrically coupled to said rotor stages.

3. The assembly according to claim 2, wherein said associated ones of said rotor magnets being simultaneously magnetized or demagnetized.

4. The assembly according to claim 1, wherein said mated pairs are magnetically isolated from each other.

5. An electric motor assembly comprising:
   an axle having a first end and a second end;
   a plurality of rotor stages, each of said rotor stages being attached to said axle, each of said rotor stages including a set of rotor magnets, each set having a greater potential magnetic field as said sets are located further from said first end and closer to said second end, each of said rotor magnets of each of said sets having a an convexly arcuate outer surface facing away from said axle, said outer surfaces of each said rotor magnet of each set being increasingly spaced from said axle as said rotor sets are located on said axle from said first end of said axle towards said second end of said axle, each of said rotor magnets of each of said sets being laterally spaced from associated ones of said rotor magnets in the same set, each of said rotor magnets comprising an electromagnet and being configured to be magnetized and demagnetized alternately, said associated ones of said rotor magnets being simultaneously magnetized or demagnetized;
   a plurality of stators, said stators being positioned around said rotor stages such that each of said rotor stages is adjacent to and covered by one of said stators to define a plurality of mated pairs, wherein each mated pair includes one of said rotor stages and one of said stators, each of said stators including a plurality of stator magnets, said mated pairs being magnetically isolated from each other, each of said stator magnets having a concavely arcuate surface facing an associated one of said rotor stages;

a stator control being electrically coupled to said rotor stages, each of said stators being electrically coupled to said stator control, said stator control being configured to magnetize said stator magnets in a controlled fashion with respect to said rotor magnets to urge said rotor magnets in a same direction and rotate said axle, said stator control being configured to control only a single one of said mated pairs to adjust power output by said axle; and wherein said axle is configured to be utilized as rotational force for a drive shaft.

6. An electric motor assembly comprising:

an axle having a first end and a second end;

a plurality of rotor stages, each of said rotor stages being attached to said axle, each of said rotor stages including a set of rotor magnets, each set having a greater potential magnetic field as said sets are located further from said first end and closer to said second end, each of said rotor magnets of each of said sets having a an convexly arcuate outer surface facing away from said axle, said outer surfaces of each said rotor magnet of each set being increasingly spaced from said axle as said rotor sets are located on said axle from said first end of said axle towards said second end of said axle, each of said rotor magnets of each of said sets being laterally spaced from associated ones of said rotor magnets in the same set, each of said rotor magnets comprising an electromagnet and being configured to be magnetized and demagnetized alternately;

a stator being positioned around said rotor stages, said stator including a plurality of stator magnets, each of said stator magnets having a concavely arcuate surface facing an associated one of said rotor stages;

a stator control being electrically coupled to said rotor stages, each of said stator magnets being electrically coupled to said stator control, said stator control being configured to magnetize said stator magnets in a controlled fashion with respect to said rotor magnets to urge said rotor magnets in a same direction and rotate said axle, said stator control being configured to control only a single one of said sets to adjust power output by said axle; and wherein said axle is configured to be utilized as rotational force for a drive shaft.

* * * * *